US009049631B2

(12) United States Patent
Choi-Grogan et al.

(10) Patent No.: US 9,049,631 B2
(45) Date of Patent: Jun. 2, 2015

(54) USAGE BASED RADIO ACCESS TECHNOLOGY SELECTION

(75) Inventors: Yung Choi-Grogan, Issaquah, WA (US); Jun Shen, Redmond, WA (US); Ming Zhang, Bellevue, WA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 541 days.

(21) Appl. No.: 13/190,728

(22) Filed: Jul. 26, 2011

(65) Prior Publication Data
US 2013/0029635 A1 Jan. 31, 2013

(51) Int. Cl.
*H04W 36/00* (2009.01)
*H04W 36/14* (2009.01)
*H04W 36/30* (2009.01)
*H04W 36/24* (2009.01)
*H04W 48/18* (2009.01)

(52) U.S. Cl.
CPC ............. *H04W 36/14* (2013.01); *H04W 36/30* (2013.01); *H04W 36/245* (2013.01); *H04W 48/18* (2013.01)

(58) Field of Classification Search
CPC . H04W 36/0022; H04W 36/14; H04W 88/06; H04W 16/14; H04W 48/18; H04W 36/30; H04W 36/0083; H04W 36/22; H04W 48/20; H04W 36/00; H04W 48/06; H04W 36/0016; H04W 40/12
USPC ........ 455/452.1, 405, 436, 450, 435.2, 435.3, 455/412.1, 435.1
See application file for complete search history.

(56) References Cited

U.S. PATENT DOCUMENTS

| 2008/0117875 | A1* | 5/2008 | Bennett et al. ................ 370/331 |
| 2008/0146223 | A1* | 6/2008 | Welnick et al. ............... 455/434 |
| 2009/0232088 | A1* | 9/2009 | Wisely .......................... 370/331 |
| 2010/0142486 | A1* | 6/2010 | Wahlqvist et al. ............ 370/332 |
| 2010/0216477 | A1  | 8/2010 | Ryan |
| 2010/0255849 | A1* | 10/2010 | Ore ............................... 455/450 |
| 2010/0284370 | A1* | 11/2010 | Samar et al. ................. 370/331 |
| 2012/0236831 | A1* | 9/2012 | Sayeedi et al. ................ 370/332 |

OTHER PUBLICATIONS

Brunner et al. "Inter-System Handover Parameter Optimization", Vehicular Technology Conference, 2006. VTC-2006 Fall. 2006 IEEE 64th, pp. 1-6.
Mani et al., "Handover Criteria Considerations in Future Convergent Networks", Global Telecommunications Conference, 2006. GLOBECOM '06. IEEE, pp. 1-5.

* cited by examiner

*Primary Examiner* — Kwasi Karikari
(74) *Attorney, Agent, or Firm* — Amin, Turocy & Watson, LLP

(57) ABSTRACT

Systems, methods, and apparatus that select a radio access technology based on a usage history are presented herein. A recording component can record, based on a first use of a wireless communication network, information identifying a radio access technology associated with the first use. A selection component can select, in response to receiving a request for a second use of the wireless communication network, the radio access technology for the second use based on the information. A transfer component can determine whether a request for a handover is based on a wireless service coverage. Further, the transfer component can determine whether a request for a reselection is based on the wireless service coverage. Moreover, the selection component can select another radio access technology for the second use in response to the request being based on the wireless service coverage.

20 Claims, 12 Drawing Sheets

USAGE BASED RADIO ACCESS TECHNOLOGY SELECTION

TECHNICAL FIELD

This disclosure relates generally to usage based radio access technology selection.

BACKGROUND

Wireless devices, e.g., cellular based devices, are ubiquitous; and radio access technologies have evolved to meet increased demands of transferring data using such devices. However, wireless communication resources associated with such demands can become scarce since conventional wireless communication technologies do not effectively perform radio access technology selection per a users' usage demand.

The above-described deficiencies of today's wireless communication technologies are merely intended to provide an overview of some of the problems of conventional technology, and are not intended to be exhaustive. Other problems with the state of the art, and corresponding benefits of some of the various non-limiting embodiments described herein, may become further apparent upon review of the following detailed description.

SUMMARY

The following presents a simplified summary to provide a basic understanding of some aspects described herein. This summary is not an extensive overview of the disclosed subject matter. It is not intended to identify key or critical elements of the disclosed subject matter, or delineate the scope of the subject innovations. Its sole purpose is to present some concepts of the disclosed subject matter in a simplified form as a prelude to the more detailed description presented later.

Conventional wireless communication technologies do not consider usage history of a wireless communication device when allocating wireless network communication resources, which are becoming scarcer with the increasing data demand.

To correct for these and other drawbacks of conventional wireless communication technologies, various systems, methods, and apparatus described herein select a radio access technology for a requested wireless communication based on a usage history associated with a subscriber of an associated network. For example, a method can record, e.g., via a storage medium, via a data storage device, etc. information associated with a use, e.g., by a subscriber, of a wireless communication network to obtain a usage history. Further, the method can select, based on the usage history, a radio access technology associated with an other use, e.g., made by the subscriber, of the wireless communication network—the other use is different than the use. In one example, the radio access technology can include second generation (2G) cellular technology, third generation (3G) cellular technology, fourth generation (4G) cellular technology, etc.

In another example, the method can select, based on the other use, a minimal required radio access technology. Further, the method can update the usage history based on the other use.

In yet another example, the method can select the radio access technology in response to receiving a request for a reselection. Further, the method can deny the request for the reselection based on the usage history. In another example, the method can grant the request for the reselection in response to the request being based on a change in wireless service coverage.

In one example, the method can select an other radio access technology for the use in response to receiving a request for a handover—the other radio access technology different than the radio access technology. Further, the method can deny the request for the handover based on the usage history. In an example, the method can grant the request for the handover in response to the request being based on a change in wireless service coverage.

In another example, the method can record the information in a removable data storage device, e.g., a subscriber identity (or identification) module (SIM) card, communicatively coupled to a wireless communication device associated with the use.

In yet another example, the method can record the information in a data storage, e.g., associated with a home subscriber server (HSS), which is communicatively coupled to the wireless communication network.

In one example, a system can include a recording component configured to record, based on a use of a wireless communication network via the wireless communication device, information identifying a radio access technology associated with the use. Further, the system can include a selection component configured to select, in response to receiving a request for an other use of the wireless communication network, the radio access technology for the other use based on the information. In another example, the selection component can further be configured to select another radio access technology for the other use based on a communication requirement of the other use. In yet another example, the selection component can be configured to select another radio access for the other use based on wireless service coverage associated with the other use. In one example, the recording component can be configured to modify the information based on the other use. In another example, the selection component can be configured to select, based on the information, for example, included in a usage history, a minimally required radio access network for yet another use, e.g., in response to the wireless communication device being powered up, registering with a wireless network, etc.

In another example, the system can include a transfer component configured to determine whether a request for a handover is based on a wireless service coverage; and the selection component can further be configured to select, for the use, an other radio access technology that is different than the radio access technology in response to the request for the handover being based on the wireless service coverage.

In yet another example, the transfer component can further be configured to determine whether a request for a reselection is based on a wireless service coverage; and the selection component can further be configured to select, for the second use, an other radio access technology that is different than the radio access technology in response to the request for the reselection being based on the wireless service coverage.

In one example, a wireless communication device can include a monitor component configured to record, based on a use of a wireless communication network, information indicating a radio access technology associated with the use. Further, the wireless communication device can include an interface component configured to send the information to a component of the wireless communication network based on an other use of the wireless communication network different than the use.

In another example, the monitor component can further be configured to record the information on a removable data storage device communicatively coupled to the wireless communication device.

In yet another example, the monitor component can further be configured to record the information in a storage medium that is communicatively coupled to the wireless communication network.

Aspects, features, and/or advantages of the disclosed subject matter can be exploited in substantially any wireless telecommunication or radio technology, e.g., wireless fidelity (Wi-Fi™); Bluetooth™, Worldwide Interoperability for Microwave Access (WiMAX™); Enhanced General Packet Radio Service (Enhanced GPRS); Third Generation Partnership Project (3GPP) Long Term Evolution (LTE™); Third Generation Partnership Project 2 (3GPP2); Ultra Mobile Broadband (UMB); 3GPP Universal Mobile Telecommunication System (UMTS); High Speed Packet Access (HSPA); High Speed Downlink Packet Access (HSDPA); High Speed Uplink Packet Access (HSUPA); LTE™ Advanced (LTE-A), Global System for Mobile Communication (GSM), Near Field Communication (NFC), Wibree, Wi-Fi Direct™ etc.

Additionally, one or more embodiments described herein can include legacy telecommunication technologies, e.g., plain old telephone service (POTS). Further, selections of a radio technology, or radio access technology, can include second generation (2G), third generation (3G), and fourth generation (4G) evolution of the radio access technology; however, such selections are not intended as a limitation of the disclosed subject matter and related aspects thereof. Further, aspects, features, and/or advantages of the disclosed subject matter can be exploited in disparate electromagnetic frequency bands. Moreover, one or more embodiments described herein can be executed in one or more network elements, such as a mobile wireless device, e.g., user equipment (UE), and/or within one or more elements of a network infrastructure, e.g., radio network controller, wireless access point (AP), etc.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
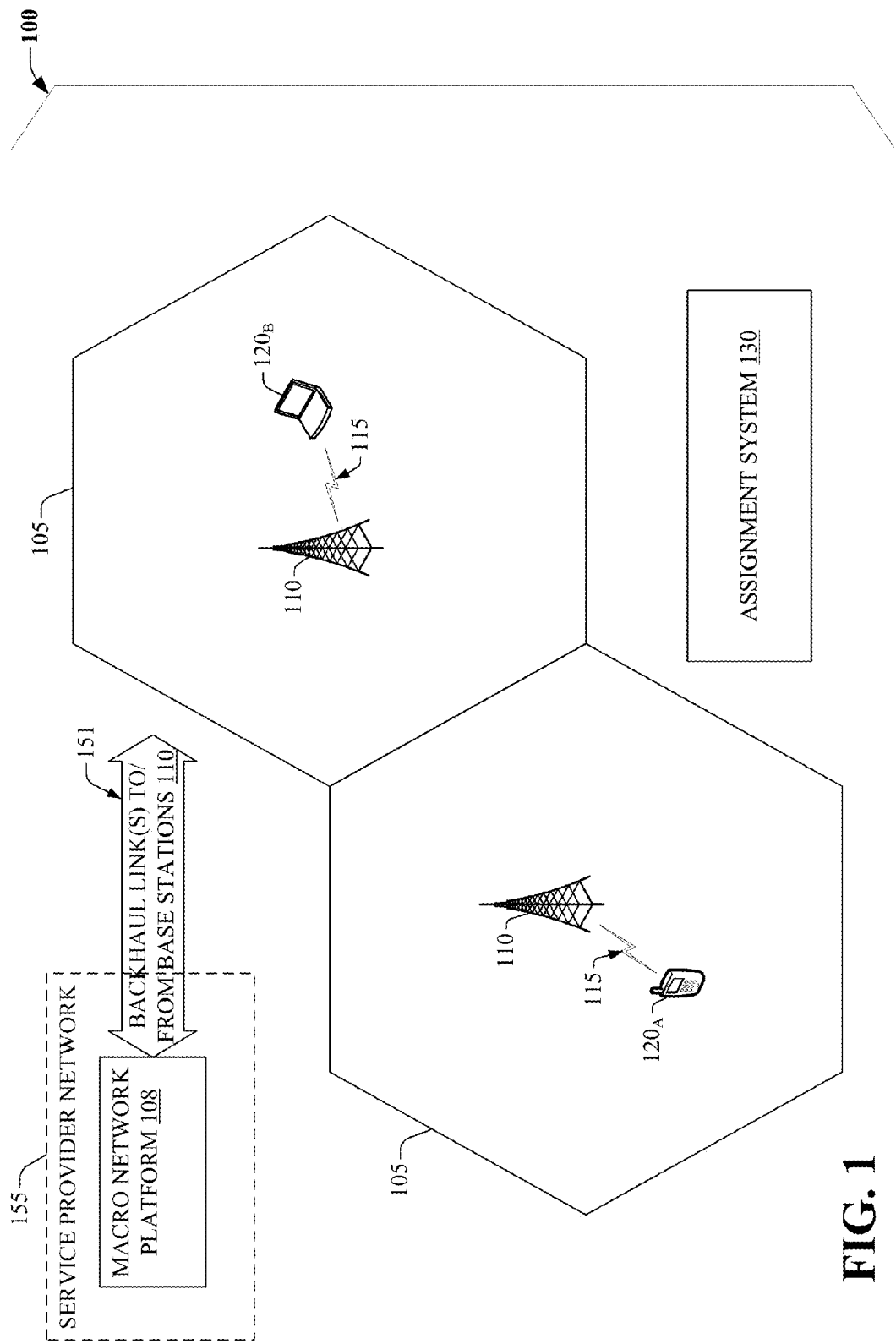
FIG. 1 illustrates a wireless environment including an assignment system, in accordance with an embodiment.

Various non-limiting embodiments of systems, methods, and apparatus are provided for selecting a radio access technology for a requested wireless communication based on a usage history associated with a subscriber of a wireless service.

In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "platform," "node," "layer," "selector," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various computer readable media having various data structures stored thereon. The components can communicate via local and/or remote processes such as in accordance with a signal having one or more data packets (e.g., data from one component interacting with another component in a local system, distributed system, and/or across a network, e.g., the Internet, with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

The word "exemplary" and/or "demonstrative" is used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

Artificial intelligence based systems, e.g., utilizing explicitly and/or implicitly trained classifiers, can be employed in connection with performing inference and/or probabilistic determinations and/or statistical-based determinations as in accordance with one or more aspects of the disclosed subject matter as described herein. For example, an artificial intelligence system can be used, via a recording component (described below), to automatically record information associated with a use of a wireless communication network to obtain a usage history. Further, the artificial intelligence system can be used, via a selection component (described below), to automatically select a radio access technology for another use based on the usage history.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, magnetic storage devices, e.g., hard disk; floppy disk; magnetic strip(s); optical disk (e.g., compact disk (CD), digital video disc (DVD), Blu-ray Disc™ (BD)); smart card(s); and flash memory device(s) (e.g., card, stick, key drive); and/or a virtual device that emulates a storage device and/or any of the above computer-readable media.

Moreover, terms like "user equipment," (UE) "mobile station," "mobile subscriber station," "access terminal," "terminal", "handset," "appliance," "machine," "wireless communication device," "cellular phone," "personal digital assistant," "smartphone," and similar terminology refer to a wireless device at least one of (1) utilized by a subscriber or user of a wireless communication service to receive and/or convey data associated with voice, video, sound, and/or substantially any data-stream or signaling-stream; or (2) utilized by a subscriber of a voice over internet protocol (VOIP) service that delivers voice communications over internet protocol (IP) networks such as the Internet or other packet-switched networks. Further, the foregoing terms are utilized interchangeably in the subject specification and related drawings.

Furthermore, the terms "user," "subscriber," "customer," "consumer," "agent," "owner," and the like are employed interchangeably throughout the subject specification and related drawings, unless context warrants particular distinction(s) among the terms. It should be appreciated that such terms can refer to human entities, or automated components supported through artificial intelligence, e.g., a capacity to make inference based on complex mathematical formalisms, which can provide simulated vision, sound recognition, decision making, etc.

Also, the terms "local wireless communications cite," "access point," "base station," and the like are utilized interchangeably throughout the subject specification, and refer to devices that can receive and transmit signal(s) from and to wireless devices through one or more antennas. In addition, the terms "wireless network" and "network" are used interchangeable in the subject application, unless context warrants particular distinction(s) among the terms.

The subject disclosure relates to systems, methods, and apparatus associated with selecting a radio access technology for a use of a wireless communication network based on a usage history. As described above, conventional wireless communication technologies do not consider a usage history of a wireless communication device when allocating wireless network communication resources, which can lead to scarcity of such resources. Compared to such techniques, various systems, methods, and apparatus described herein can select a radio access technology for a requested wireless communication based on a usage history associated with a subscriber of a wireless service.

Aspects of systems, apparatus, and processes explained herein can constitute machine-executable instructions embodied within a machine, e.g., embodied in a computer readable medium associated with the machine. Such instructions, when executed by the machine, can cause the machine to perform the operations described. Additionally, the systems and processes can be embodied within hardware, such as an application specific integrated circuit (ASIC) or the like. Moreover, the order in which some or all of the process blocks appear in each process should not be deemed limiting. Rather, it should be understood by a person of ordinary skill in the art having the benefit of the instant disclosure that some of the process blocks can be executed in a variety of orders not illustrated.

Now referring to FIG. 1, a wireless environment 100 including an assignment system 130 is illustrated, in accordance with an embodiment. Wireless environment 100 can include macro cells 105 and base stations 110 for wireless coverage. Each macro cell 105 represents a "macro" cell coverage area, or sector, served by a base station 110. It should be appreciated that although macro cells 105 are illustrated as hexagons, macro cells 105 can adopt other geometries generally dictated by a deployment or topography of the macro cell coverage area, or covered geographic area, e.g., metropolitan statistical area (MSA), rural statistical area (RSA), etc. The Macro cell could also be replaced by a micro-cell, a picocell, or a femtocell in this example. Macro cell coverage is generally intended to serve mobile wireless devices, e.g., mobile wireless device 120$_A$, mobile wireless device 120$_B$, in outdoor locations. An over-the-air wireless link 115 provides the macro coverage, and wireless link 115 comprises a downlink (DL) and an uplink (UL) (both not shown) that can utilize a predetermined band of radio frequency (RF) spectrum associated with, e.g., GSM, 3GPP UMTS. Accordingly, mobile wireless device 120$_A$ can be a GSM and/or 3GPP UMTS mobile phone, while 120$_B$ can be a remote computing device with GSM and/or 3GPP UMTS capabilities.

Base station 110—including associated electronics, circuitry and/or components—and wireless link 115 form a radio network, e.g., base station subsystem (BSS) associated with a GSM wireless network, or radio access network (RAN) associated with a UMTS wireless network. In addition, base station 110 communicates with macro network platform 108 via backhaul link(s) 151. Macro network platform 108 represents a core network comprising one or more cellular wireless technologies, e.g., 3GPP UMTS, GSM, etc. In one aspect, macro network platform 108 controls a set of base stations 110 that serve either respective cells or a number of sectors within such cells. Macro network platform 108 can also communicate with other base stations (not shown) that serve other cells (not shown). Backhaul link(s) 151 can include a wired backbone link, e.g., optical fiber backbone, twisted-pair line, T1/E1 phone line, synchronous or asynchronous digital subscriber line (DSL), asymmetric DSL (ADSL), coaxial cable, etc. Moreover, backhaul links(s) 151 can link disparate base stations 110 based on macro network platform 108.

Packet communication, e.g., voice traffic, data traffic, is typically routed through a broadband wired network backbone (or backhaul network) utilizing, e.g., optical fiber backbone, twisted-pair line, T1/E1 phone line, synchronous or asynchronous digital subscriber line (DSL), asymmetric DSL (ADSL), coaxial cable, etc. To this end, base station 110 is typically connected to the backhaul network, e.g., service provider network 155, via a broadband modem (not shown) and backhaul link(s) 151. Through backhaul link(s) 151, base station 110 can handle substantially any quality of service (QoS) for heterogeneous packetized traffic, e.g., various multiple packet flows.

Further, base station 110 can integrate into an existing network, e.g., GSM or 3GPP network, via various interfaces, for example: via an A-bis interface (not shown) between a base transceiver station (BTS) and a base station controller (BSC); via an Iub interface (not shown) between a radio network controller (RNC) and base station 110; via an interface (not shown) between an RNC and a Circuit Switched Core Network (CS-CN); via an interface (not shown) between an RNC and an Iu-CS interface; via an interface (not shown) between an RNC and a Packet Switched Core Network (or Iu-PS interface); via an interface (not shown) between a BSC and a mobile switching center (MSC) and/or Network Switching Subsystem (NNS); via an interface (not shown) between a Serving General Packet Radio Service Support Node (SGSN) and a public data network (PDN) (or Gi interface); via an interface (not shown) between an SGSN and other SGSNs (or Gn interface).

It should be appreciated that although assignment system 130 is illustrated in FIG. 1 as an entity distinct from, e.g., base stations 110, mobile wireless devices 120$_A$ and 120$_B$, service provider network 155, etc., aspects, components, and/or features of assignment system 130 can be located/included within and/or across one or more components, e.g., hardware, software, etc., of wireless network 100. For example, in one embodiment, assignment system 130 can be located within any component(s) of a GSM and/or UMTS core network, e.g. service provider network 155. In another embodiment, assignment system 130 can be located in hardware and/or software of base station 110, mobile wireless device 120$_A$, and/or mobile wireless device 120$_B$. Moreover, it should be appreciated that features and advantages of the subject innovation can be implemented in microcells, picocells, or the like, wherein base station 110 can be embodied in an access point.

As described above conventional wireless communication technologies do not consider a usage history of a wireless communication device when allocating wireless network communication resources, which can lead to scarcity of such resources. To correct for these and other drawbacks of such technologies, assignment system 130 can optimally allocate communication resources within wireless network 100 by selecting a radio access technology for a requested wireless communication, e.g., made by a subscriber via mobile wireless device 120$_A$ and/or mobile device 12$_B$, based on a usage history associated with the subscriber. In an aspect, the usage history can be stored in a removable data storage device, e.g., SIM card, which is communicatively coupled to mobile wireless device 120$_A$ and/or mobile device 120$_B$. Further, the usage history can include information identifying the radio access technology associated with a prior use of the wireless network.

Figure 2:
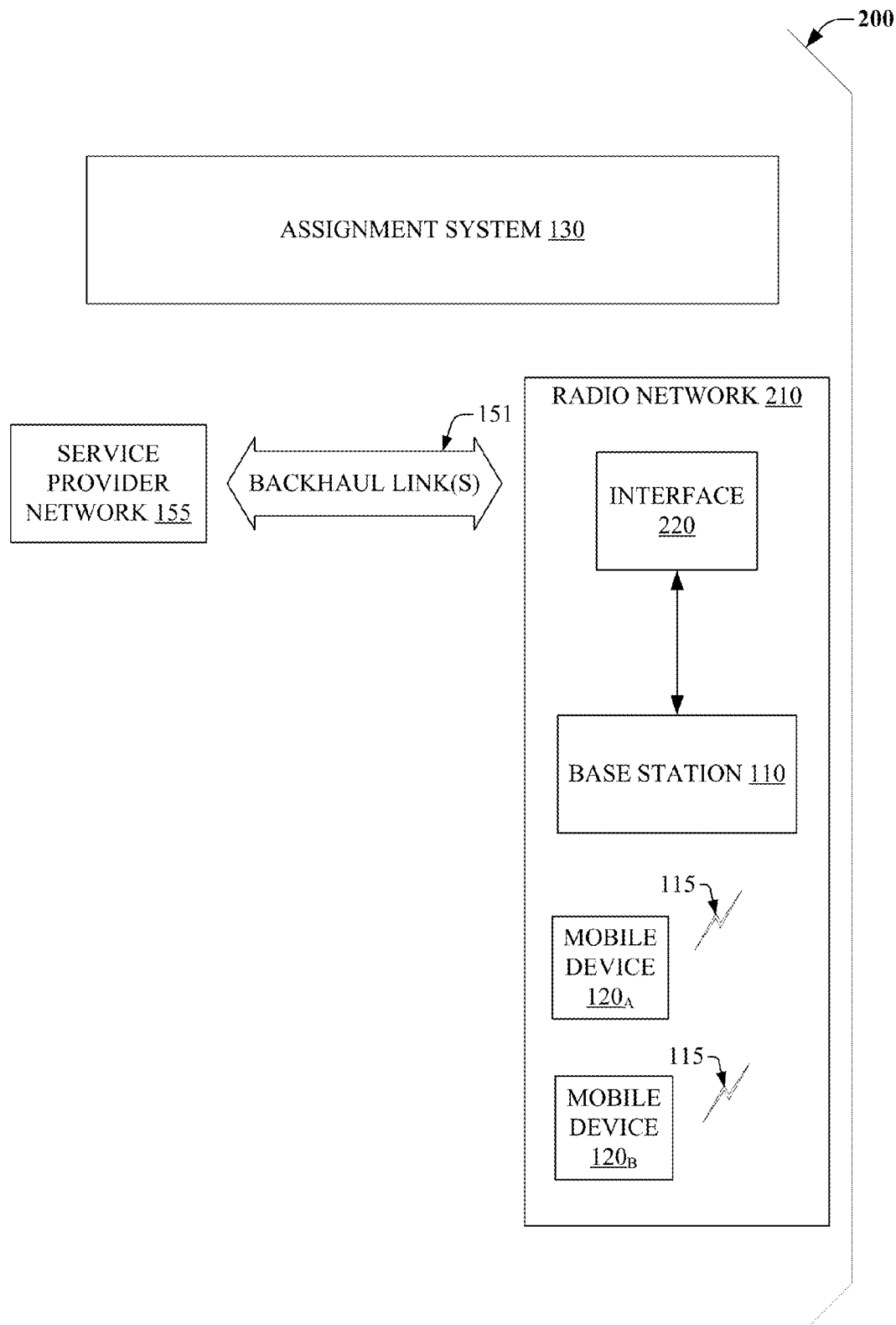
FIG. 2 illustrates another wireless environment including an assignment system, in accordance with an embodiment.

FIG. 2 illustrates another wireless environment (200), in accordance with an embodiment. Wireless environment 200 can comprise one or more base stations 110, for example: coupled to interface 220, e.g., a base station controller (BSC) of a base station subsystem (BSS); a radio network controller (RNC) of a UMTS Terrestrial Radio Access Network (UTRAN), etc. Radio network 210 can couple to a core network, e.g., service provider network 155, via one or more backhaul links 151 (see above) to facilitate wireless communication and data transfer to one or more wireless devices, e.g., mobile wireless device 120$_A$/mobile wireless device 120$_B$, via over-the-air wireless link 115. Moreover, radio network 210 can comprise any wireless technology, e.g., GSM, UMTS, etc.

Wireless environment 200 includes assignment system 130, which can effectively allocate communication resources within wireless environment 200 by selecting a radio access technology for a requested use of radio network 210 based on a prior use, e.g., via mobile wireless device 120$_A$, of radio network 210—the prior use utilizing the radio access technology. In another example, assignment system 130 can select an other radio access technology for the requested use of radio network 210 based on a communication requirement, e.g., bandwidth requirement, of the requested use, irrespective of the prior use.

It should be appreciated that although assignment system 130 is illustrated in FIG. 2 as an entity distinct from radio network 210, service provider network 155, mobile device 120$_A$, mobile device 120$_B$, base station 110, etc. aspects, components, and/or features of assignment system 130 can be located/included within and/or across one or more components, e.g., hardware, software, etc., of wireless environment 200, e.g., within or among hardware and/or software of components of radio network 210, service provider network 155, mobile device 120$_A$, mobile device 120$_B$, base station 110, etc.

Figure 3:
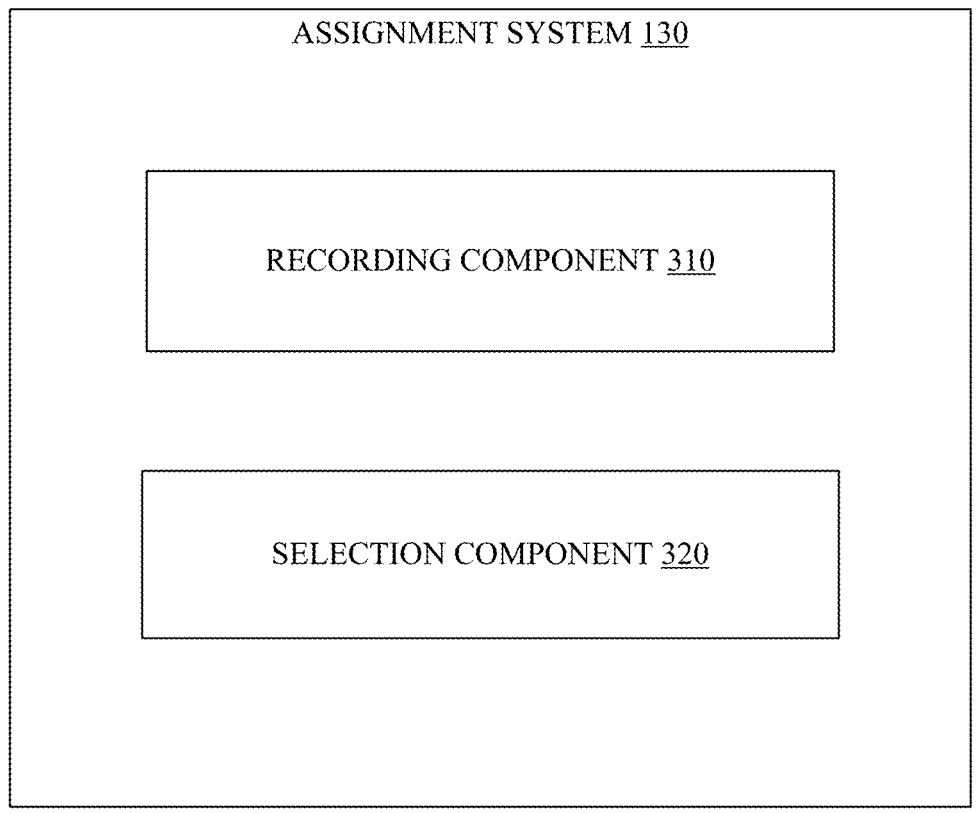
FIG. 3 illustrates an assignment system, in accordance with an embodiment.

Referring now to FIG. 3, an assignment system (130) including recording component 310 and selection component 320 is illustrated, in accordance with an embodiment. Recording component 310 can be configured to record, based on a first use of a wireless communication network via a mobile communication device, information identifying a radio access technology associated with the first use. Further, selection component 320 can be configured to select, in response to receiving a request for a second use of the wireless communication network, the radio access technology for the second use based on the information. In an aspect, selection component 320 can be configured to select, in response to an initialization, a power up, etc. of the mobile communication device, for example, in response to the mobile communication device searching for and/or registering with a wireless network upon being powered up, a minimally required radio access technology for a use of the mobile communication device based on a usage history (see below) that is associated with the information and accessed by recording component 310.

In one aspect, the information can be recorded, or stored, via recording component 310 as a usage history associated with a subscriber that is associated with the mobile communication device. For example, if the mobile communication device is 3G capable, or capable of transferring data based on a 3G radio access technology, but the subscriber used, e.g., via the mobile communication device or another mobile communication device, the wireless communication network to complete 2G compatible communication(s), e.g., during a most recent use of the wireless communication network, or the subscriber used the wireless communication network to complete 2G compatible communications more often than completing 3G communications via the wireless communication network, then recording component 310 can record information, e.g., in the usage history, indicating that the first use of the wireless communication network was based on 2G compatible communication(s).

As such, selection component 320 can select a 2G compatible radio access technology for the second use of the wireless communication network based on the usage history, which indicated that the first use was based on 2G radio access technology. Thus, 3G radio access technology resource(s) of the wireless communication network can be preserved for data intensive, or high bandwidth, communications—facilitating optimal use of wireless communication network resources as 3G communication resources are not used to complete 2G compatible communication(s).

In an aspect, the information identifying the radio access technology can be stored, via recording component 310, in a removable storage device, e.g., SIM card, which is communicatively coupled to the wireless communication device. In one aspect, the information can be stored, via recording component 310, in a data storage that is communicatively coupled to the wireless communication network. For example, the data storage can be communicatively coupled to a home subscriber server (HSS).

In other aspect(s), selection component 320 can select the minimal required evolution, or generation, of radio access technology for the second use of the wireless communication network. For example, if a wireless communication device associated with a subscriber is configured to utilize an N-th generation radio access technology, but the subscriber requests access to a wireless communication network via an (N-1)-th, (N-2)-th, etc. generation radio access technology, then selection component can select the (N-1)-th, (N-2)-th, etc. generation radio access technology for the access, in response such technology meeting minimum communication requirements for the second use.

In another aspect, selection component 320 can be configured to select an other radio access technology for the second use based on a communication requirement of the second use. For example, if the second use is associated with a 3G data application, then selection component 320 can select 3G compatible radio access technology for the second use of the wireless communication network, even though the usage history indicates that the first use was based on 2G radio access technology.

In another example, if the second use is associated with a 2G communication, but the usage history indicates that the first use was based on 3G radio access technology, then selection component can be configured to select 2G compatible radio access technology for the second use of the wireless communication network, for example, to preserve use of 3G radio access technology of the wireless communication network for more data intensive communications associated with other communication requests on the wireless communications network.

In an aspect, selection component 320 can be further configured to select an other radio access technology for the second use based on a wireless service coverage associated with the second use. For example, if the second use can be serviced in a wireless service coverage area that is associated with 4G radio access technology, then selection component 320 can select 4G compatible radio access technology for the second use of the wireless communication network, even though the usage history indicates that the first use was based on, or associated with, 2G radio access technology.

In one aspect, recording component 310 can be configured to modify the information, or the usage history, based on the second use. Referring to the previous example, recording component 310 can modify the usage history to indicate that the second use was based on, or associated with, 4G compatible radio access technology in response to selection component 320 selecting 4G compatible radio access technology for the second use of the wireless communication network.

Figure 4:
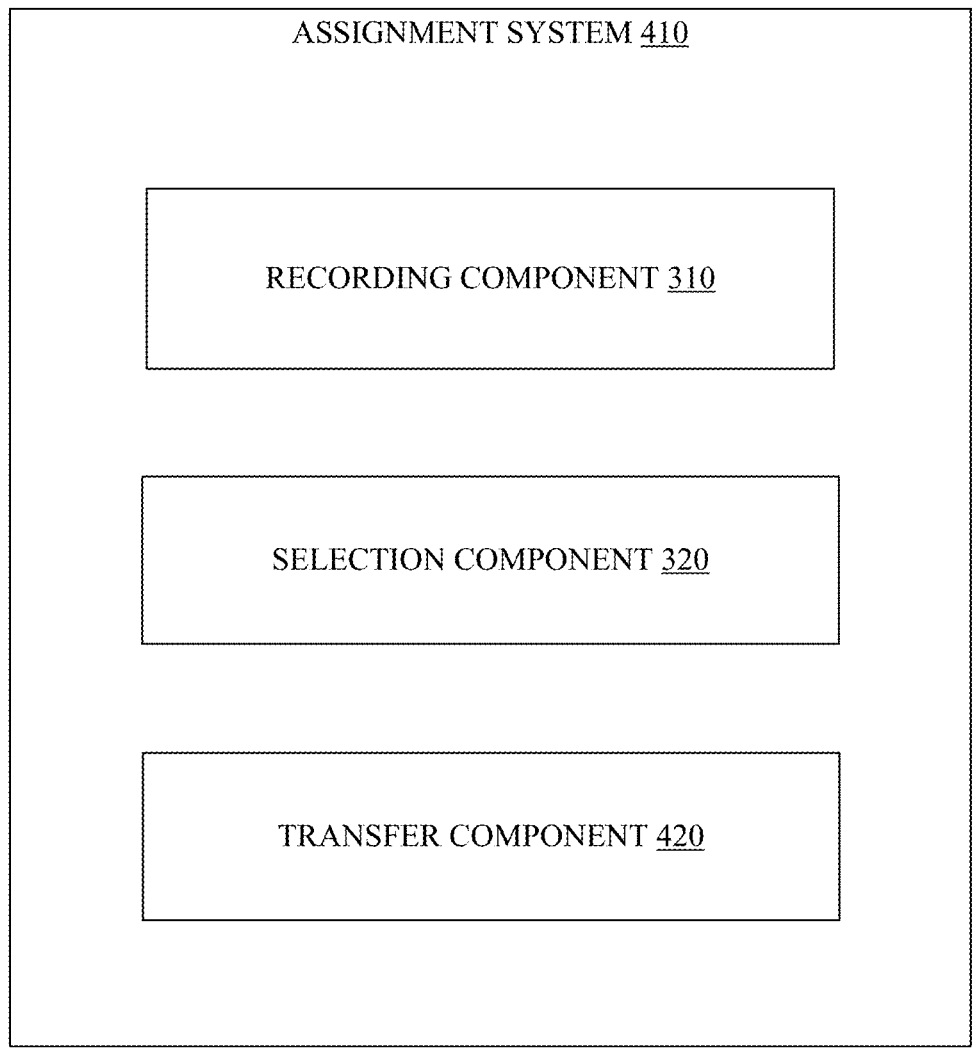
FIG. 4 illustrates another assignment system, in accordance with an embodiment.

FIG. 4 illustrates another assignment system, in accordance with an embodiment. Assignment system can include recording component 310, selection component 320, and transfer component 420. In one aspect, transfer component 420 can be configured to determine whether a request for a handover is based on the wireless network configurations, or based on wireless service coverage.

In a cellular based system, a mobile wireless device can communicate with a base station within a wireless coverage area, or sector, of the base station. During an active voice and/or data communication, e.g., phone call, a cellular communication network can transfer the voice and/or data communication, via a handover, from one portion of the cellular communication network to another portion of the cellular network, e.g., from the base station to an other base station, in response to the mobile wireless device moving away from the wireless coverage area of the base station—to prevent termination of the active voice and/or data session.

In an aspect, if transfer component 420 determines that the request for the handover is based on wireless service coverage, e.g., in response to the mobile wireless device moving away from the wireless coverage area of the base station to an other wireless coverage area associated with the other base station, then selection component 320 can be further configured to select, for the use, an other radio access technology, which is different than the radio access technology, for the second use, e.g., to prevent termination of the active voice or data session—the other radio access technology associated with the other wireless coverage area. As such (as described above), selection component 320 can select the other radio access technology for the second use of the wireless communication network, even though the usage history indicates that the first use was based on, or associated with, a radio access technology different from the other radio access technology.

In yet another aspect, transfer component 420 can be configured to determine whether a request for a reselection is based on a wireless service coverage. When the mobile wireless device is powered on between calls, the mobile wireless device operates in an idle mode. During the idle mode, the mobile wireless device can perform a reselection procedure to transition between base stations and/or wireless access points, e.g., based on base station/wireless access point signal quality. For example, the mobile wireless device can monitor one or more control and/or broadcast channels of proximate base stations to obtain information for selecting a base station for servicing an incoming/outgoing call in the active mode. Such information can include a neighbor list, which identifies channels of proximate base stations the mobile wireless device can monitor during the idle mode. As the mobile wireless device moves within a sector served by a base station, the mobile wireless device can monitor the channels of base stations and/or access points and determine a "best channel", e.g., based on a communication signal quality of a respective communication channel, for active mode operation.

In one aspect, if transfer component 420 determines that the request for the reselection is based on wireless service coverage, e.g., in response to the mobile wireless device indicating that signal quality can improve based on the reselection, then selection component 320 can be further configured to select, for the second use, an other radio access technology that is different than the radio access technology,e.g., to improve signal quality associated with servicing an incoming/outgoing call in the active mode. As such (as described above), selection component 320 can select the other radio access technology for the second use of the wireless communication network, even though the usage history indicates that the first use was based on, or associated with, a radio access technology that is different from the other radio access technology.

Figure 5:
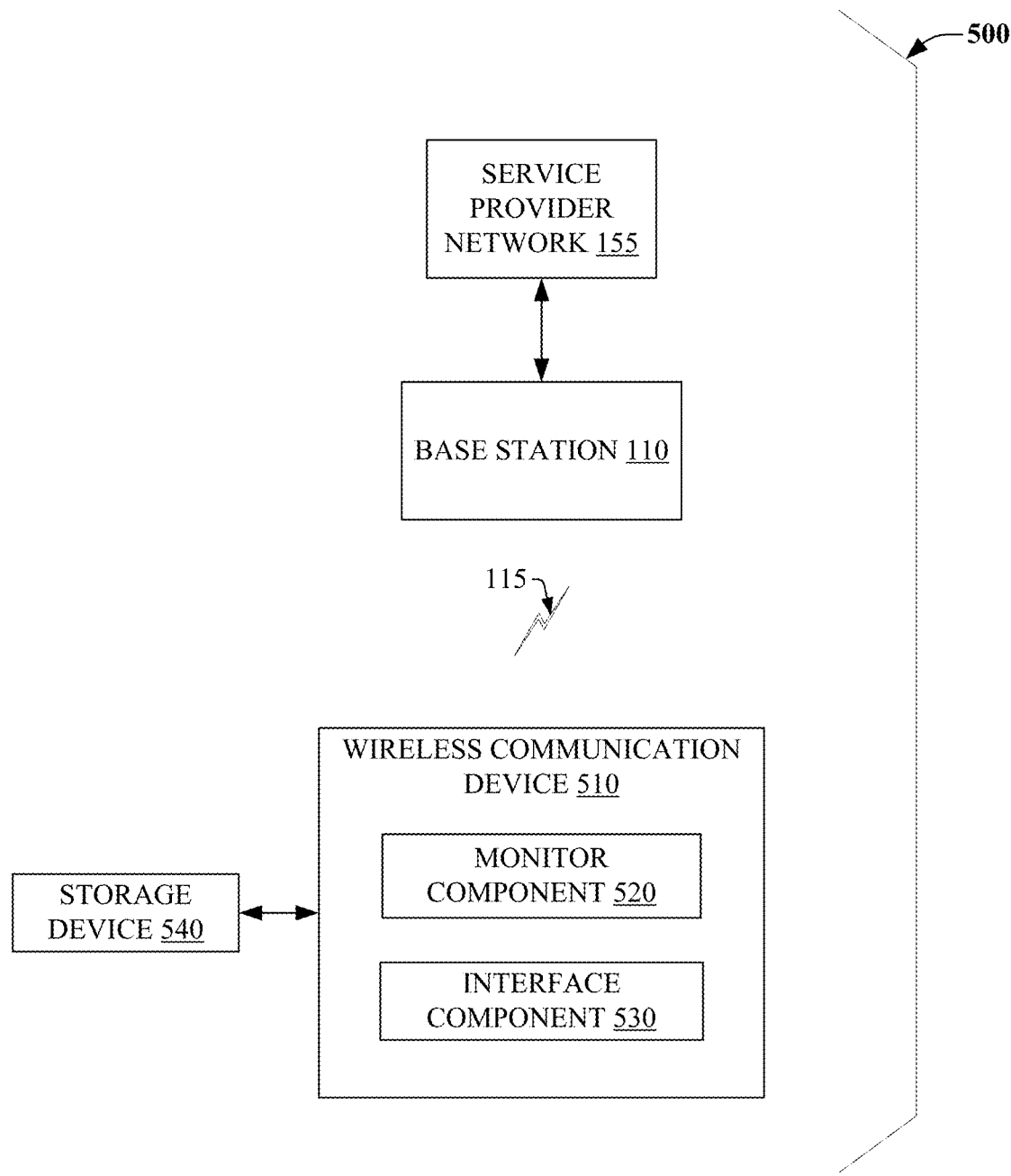
FIG. 5 illustrates a wireless environment including a wireless communication device, in accordance with an embodiment.

Now referring to FIG. 5, a wireless environment 500 including a wireless communication device 510 is illustrated, in accordance with an embodiment. Service provider network 155 can facilitate wireless communication and/or data transfer to/from wireless communication device 510, e.g., a cellular phone, a personal data assistant (PDA), a mobile phone, etc. via over-the-air wireless link 115. The wireless communication and/or data transfer can include any wireless technology, e.g., GSM, UMTS, etc.

Wireless communication device 510 can include a monitor component 520 that can be configured to record, based on a use of service provider network 155, information indicating a radio access technology associated with the use. For example, monitor component 520 can record the information in storage device 540, e.g., a removable storage device, a SIM card, etc. that is communicatively coupled to the wireless communication device.

Further, wireless communication device 510 can include an interface component 530 that can be configured to send the information to a component of wireless environment 500, e.g., a component of service provider network 155, a component of base station 110, etc. based on an other use of wireless environment 500—the other use different than the use. In an aspect, the information can be received by the component of wireless environment 500 and stored in a usage history that is included in a storage medium communicatively coupled to the component of wireless environment 500. As such, service provider network 155 can be configured to select the radio access technology for the other use based on the usage history.

FIGS. 6-9 illustrate methodologies in accordance with the disclosed subject matter. For simplicity of explanation, the methodologies are depicted and described as a series of acts. It is to be understood and appreciated that the subject innovation is not limited by the acts illustrated and/or by the order of acts. For example, acts can occur in various orders and/or concurrently, and with other acts not presented or described herein. Furthermore, not all illustrated acts may be required to implement the methodologies in accordance with the disclosed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 6:
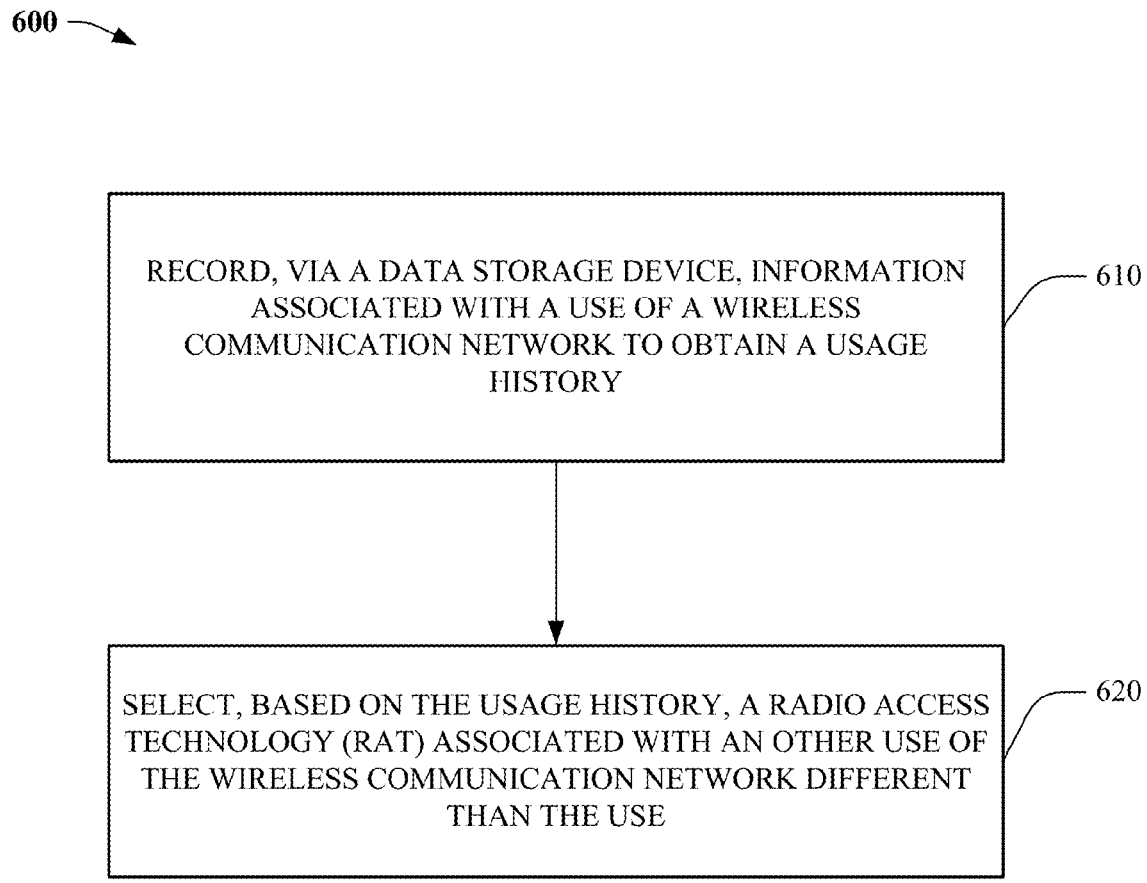
FIGS. 6-9 illustrate various processes, in accordance with an embodiment.
Figure 7:
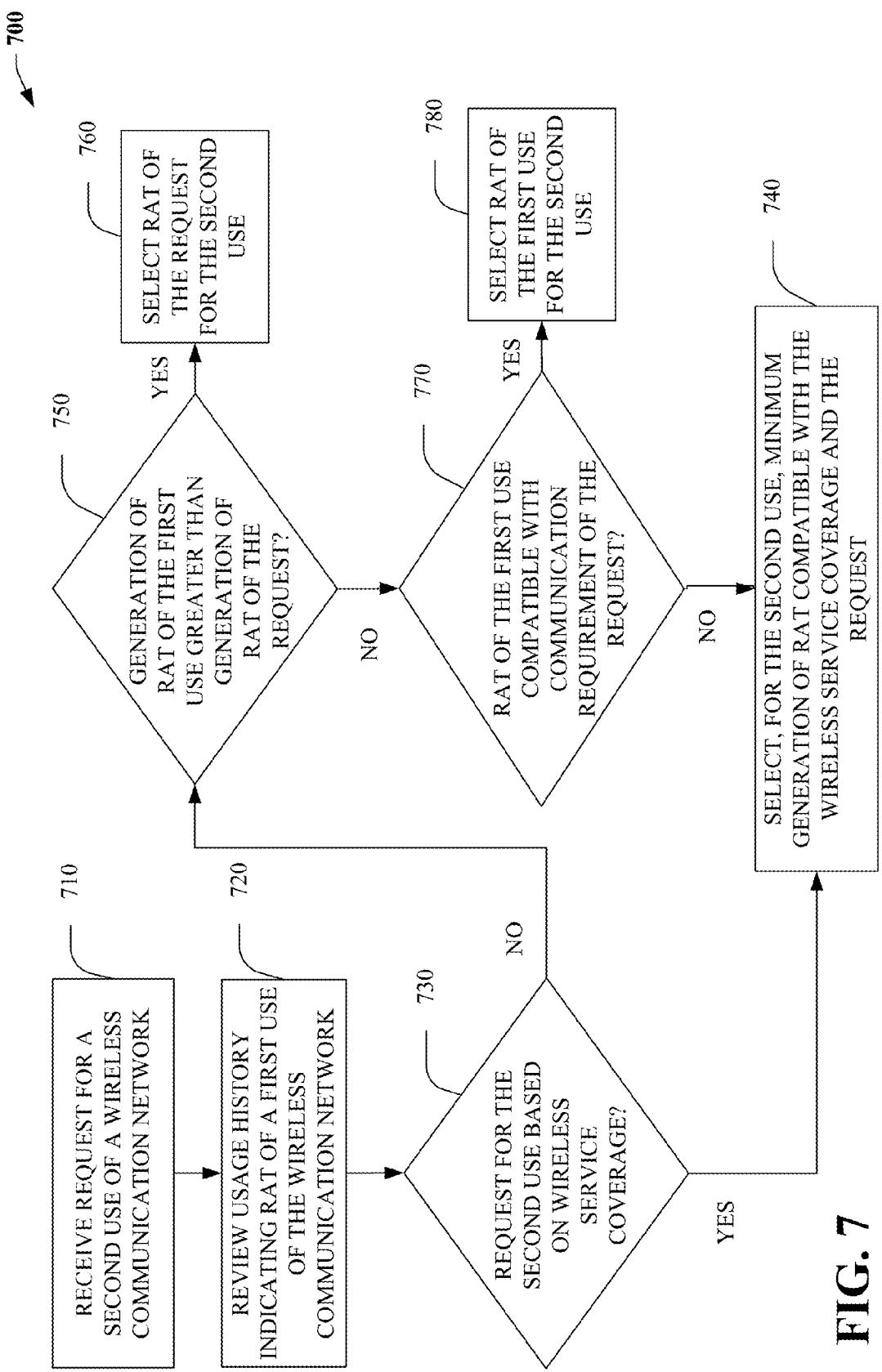

Referring now to FIGS. 6-7, processes (600, 700) for selecting a radio access technology based on a usage history are illustrated, in accordance with embodiments. At 610, information associated with a use, or a first use, of a wireless communication network can be recorded, e.g., via recording component 310, to obtain a usage history, e.g., for a subscriber associated with the use. In an aspect, the usage history can identify an evolution, or generation, of radio access technology associated with the use. In another aspect, the usage history can be recorded in a removable data storage device, e.g., SIM card, which is communicatively coupled to a wireless communication device, e.g., 120$_A$, 120$_B$, storage device 540, etc. In one aspect, the usage history can be recorded in data storage that is communicatively coupled to the wireless communication network, e.g., via an HSS. At 620, a radio access technology associated with another use, or a second use, e.g., by the subscriber, of the wireless communication network can be selected based on the usage history.

For example, and now referring to FIG. 7, a request, e.g., by the subscriber, for the second use of a wireless communication network can be received, e.g., via assignment system 130, at 710. Further, assignment system 130 can review, at 720, the usage history indicating a radio access technology of the first use of the wireless communication network. At 730, process 700 can determine, e.g., via selection component 320, whether the request for the second use is based on wireless service coverage. In an aspect, the wireless service coverage can be related to a loss of wireless service coverage, e.g., when the wireless communication device moves from a first wireless service coverage area to a second wireless service coverage area. If process 700 determines that the request for the second use is based on wireless service coverage, then process 700 can select for the second use, at 740, a minimum generation, or evolution, of radio access technology that is compatible with the second wireless service coverage area and the request.

On the other hand, if process 700 determines at 730 that the request for the second use is not based on wireless service coverage, then process 700 can determine (at 750) whether a generation of the radio access technology of the first use is greater than a generation of the radio access technology of the request for the second use. If the generation, e.g., 4G, of radio access technology of the first use is greater that the generation, e.g., 3G, of radio access technology of the request, then process 700 can select, at 760, the radio access technology, e.g., 3G, of the request for the second use; otherwise, at 770, process 700 can determine whether the radio access technology of the first use is compatible with a communication requirement, e.g., data transfer requirement, of the request.

If process 700 determines that the radio access technology of the first use is not compatible with the communication requirement of the request, then process 700 can select, at 740, for the second use, e.g., via selection component 320, a minimum generation of radio access technology that is compatible with the wireless service coverage and the request; otherwise, process 700, e.g., via selection component 320, can select, at 780, the radio access technology of the first use for the second use.

Figure 8:
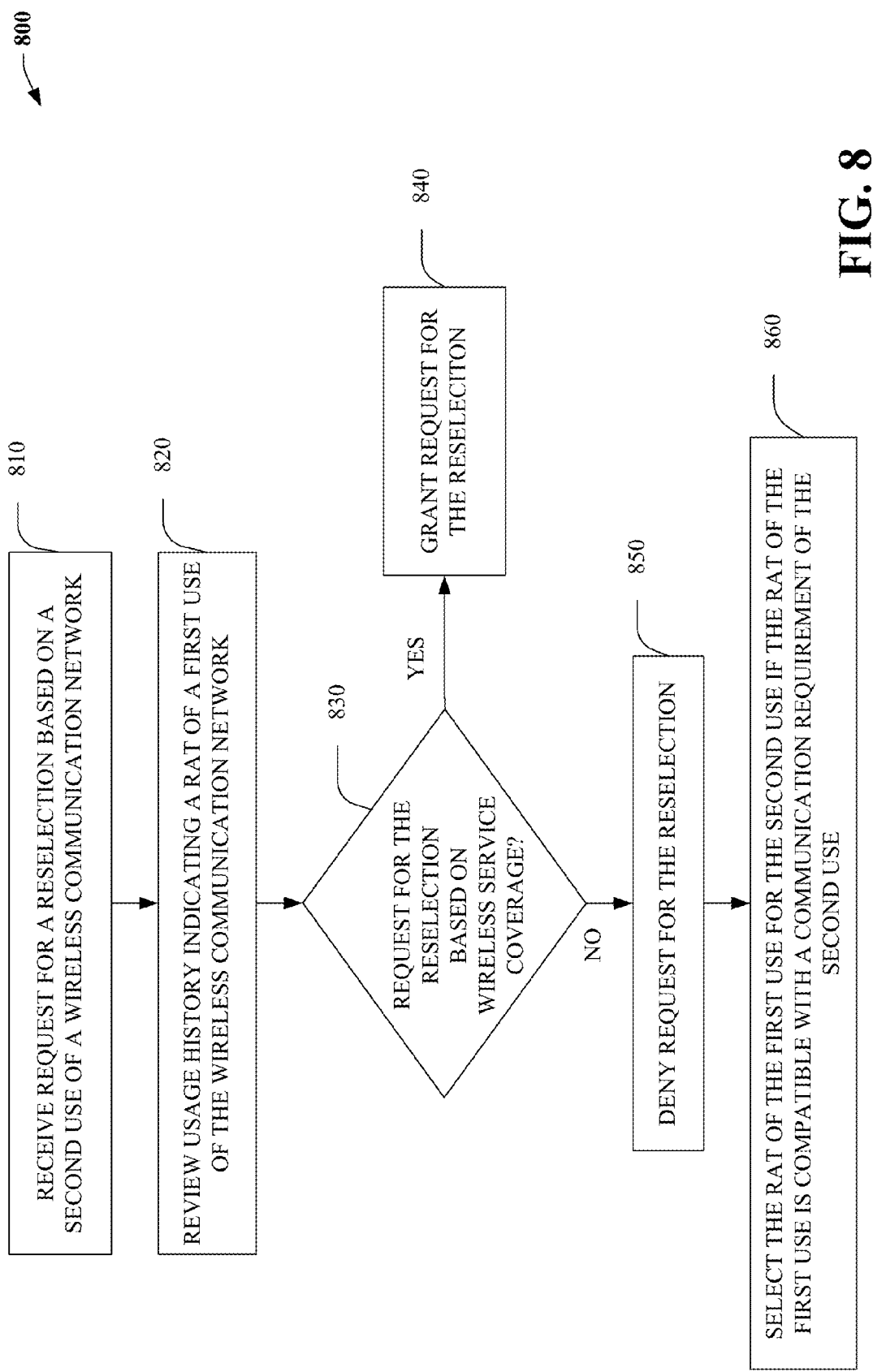

Now referring to FIG. 8, another process (800) for selecting a radio access technology based on a usage history is illustrated, in accordance with an embodiment. At 810, process 800 can receive a request for a reselection based on a second use of a wireless communication network. At 820, process 800 can review a usage history indicating a radio access technology of a first use of the wireless communication network. Process 800 can determine, at 830, whether the request for the reselection is based on wireless service coverage, e.g., related to a signal quality of a communication channel. Process 800 can grant, at 840, the request for the reselection if the request is based on wireless service coverage, e.g., the signal quality of the communication channel; otherwise, process 800 can deny the request for the reselection at 850; and select, at 860, the radio access technology of the first use for the second use if such radio access technology is compatible with a communication requirement of the second use. In another aspect (not shown), process 800 can select a minimum generation of radio access technology that is compatible with the wireless service coverage associated with the second use.

Figure 9:
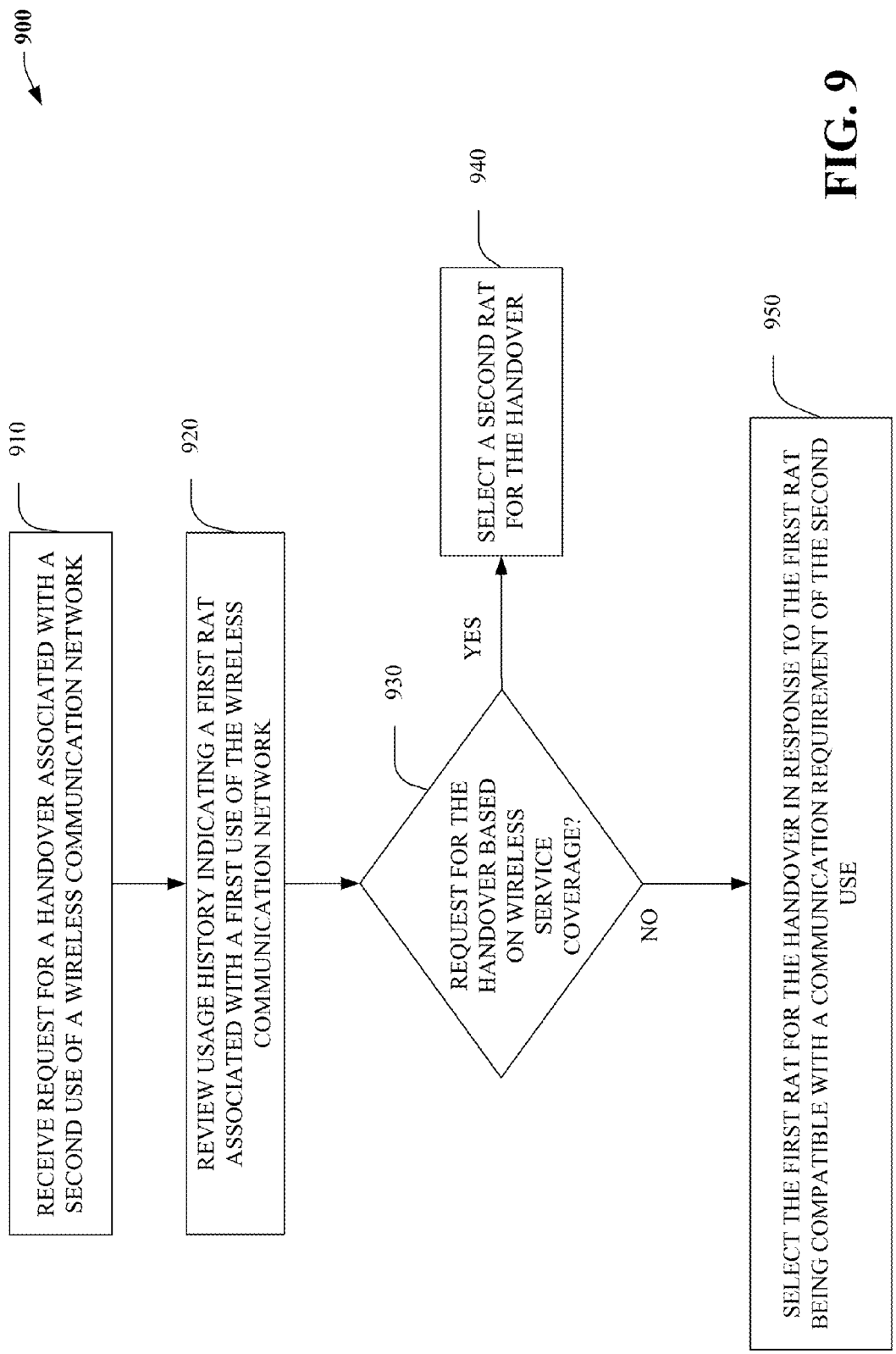

FIG. 9 illustrates yet another process (900) for selecting a radio access technology based on a usage history, in accordance with an embodiment. At 910, process 900 can receive a request for a handover that is associated with a second use of a wireless communication network. At 920, process 900 can review a usage history indicating a first radio access technology that is associated with a first use of the wireless communication network. Process 900 can determine, at 930, whether the request for the handover is based on wireless service coverage, e.g., related to a signal quality of a communication channel. Process 900 can select, at 940, a second radio access technology for the handover in response to the request for the handover being based on wireless service coverage, e.g., the signal quality of the communication channel; otherwise, process 900 can select the first radio access technology for the handover in response to the first radio access technology being compatible with a communication requirement of the second use. In another aspect (not shown), process 900 can select a minimum generation of radio access technology that is compatible with the wireless service coverage associated with the handover.

Figure 10:
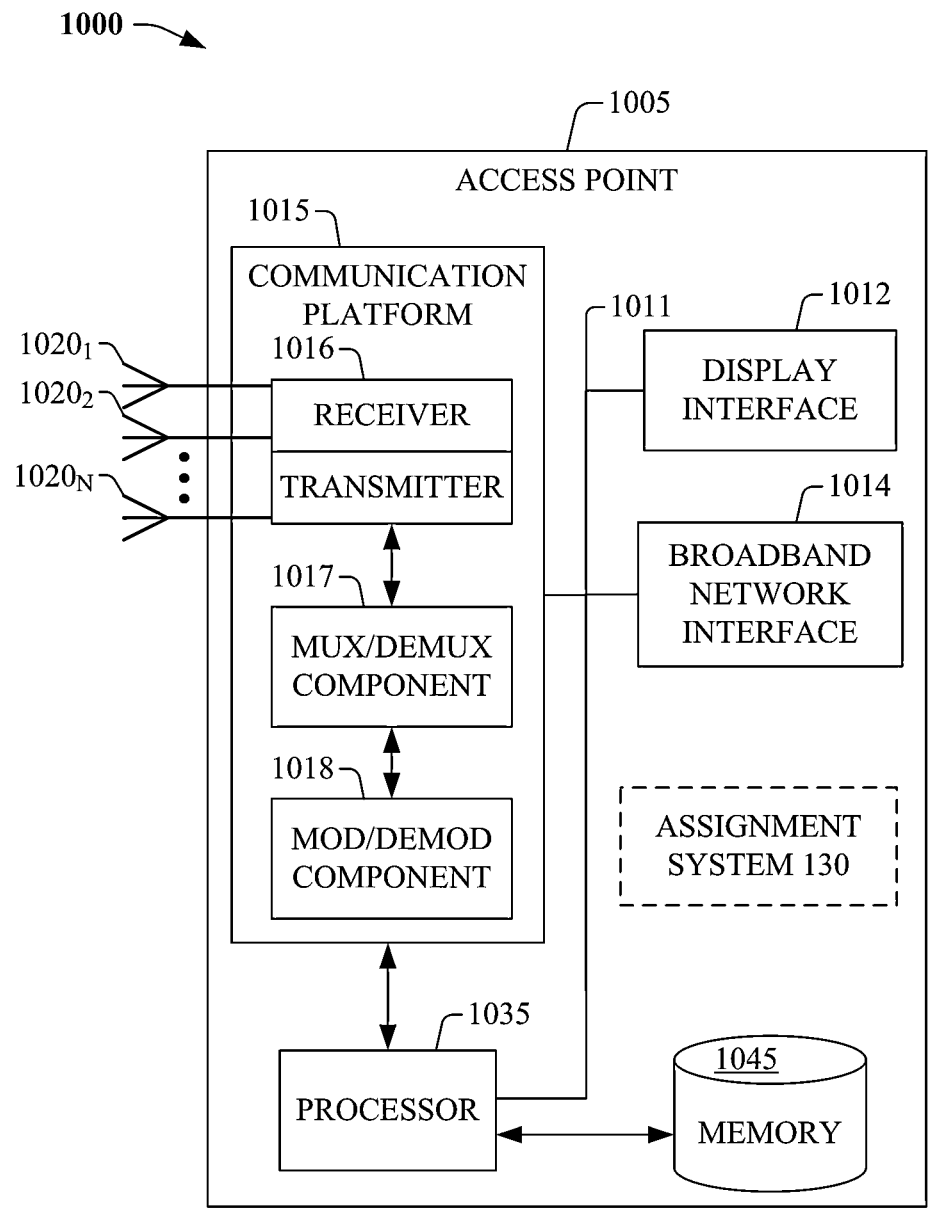
FIG. 10 illustrates a block diagram of an access point, in accordance with an embodiment.

To provide further context for various aspects of the disclosed subject matter, FIG. 10 illustrates a block diagram of an embodiment 1000 of an access point 1005, e.g., base station, wireless access point, femtocell access point, etc. that can enable and/or exploit features or aspects of the disclosed subject matter.

In embodiment 1000, access point 1005 can receive and transmit signal(s) from and to wireless devices (e.g., $120_A$, $120_B$, storage device 540, etc.), wireless ports, wireless routers, etc. through segments $1020_1$-$1020_N$ (N is a positive integer). Segments $1020_1$-$1020_N$ can be internal and/or external to access point 1005, and can be controlled by selection component 320. Further, selection component 320 can couple to communication platform 1015, which comprises electronic components and associated circuitry that provide for processing and manipulation of received signal(s) and other signal(s) to be transmitted.

In an aspect, communication platform 1015 includes a receiver/transmitter 1016 that can convert analog signals to digital signals upon reception of the analog signals, and convert digital signals to analog signals upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signals in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information, e.g., codes, according to substantially any code known in the art, e.g., Hadamard-Walsh codes, Baker codes, Kasami codes, polyphase codes, etc. A modulator/demodulator 1018 is also a part of communication platform 1015, and can modulate information according to multiple modulation techniques, such as frequency modulation, amplitude modulation, e.g., M-ary quadrature amplitude modulation (QAM), with M a positive integer); phase-shift keying (PSK); etc.

Access point 1005 also includes a processor 1035 configured to confer, at least in part, functionality to substantially any electronic component in access point 1005. In particular, processor 1035 can facilitate configuration of access point 1005 via, e.g., assignment system 130 and one or more component therein. Additionally, access point 1005 can include display interface 1012, which can display functions that control functionality of access point 1005, or reveal operation conditions thereof. In addition, display interface 1012 can include a screen to convey information to an end user. In an aspect, display interface 1012 can be an LCD, a plasma panel, a monolithic thin-film based electrochromic display, and so on. Moreover, display interface 1012 can also include a component (e.g., speaker) that facilitates communication of aural indicia, which can also be employed in connection with messages that convey operational instructions to an end user. Display interface 1012 can also facilitate data entry e.g., through a linked keypad or via touch gestures, which can cause access point 1005 to receive external commands, e.g., restart operation.

Broadband network interface 1014 facilitates connection of access point 1005 to a service provider network (not shown), e.g., service provider network 155, that can comprise one or more cellular technologies (e.g., 3GPP UMTS, GSM, etc.) via backhaul link(s) (not shown), e.g., backhaul link(s) 151, which enable incoming and outgoing data flow. Broadband network interface 1014 can be internal or external to access point 1005, and can utilize display interface 1012 for end-user interaction and status information delivery.

Processor 1035 can be functionally connected to communication platform 1015 and can facilitate operations on data, e.g., symbols, bits, or chips, for multiplexing/demultiplexing, such as effecting direct and inverse fast Fourier transforms, selection of modulation rates, selection of data packet formats, inter-packet times, etc. Moreover, processor 1035 can be functionally connected, via data, system, or address bus 1011, to display interface 1012 and broadband network interface 1014, to confer, at least in part, functionality to each of such components.

In access point 1005, memory 1045 can retain location and/or coverage area, e.g., macro sector, identifier(s); access list(s) that authorize access to wireless coverage through access point 1005; sector intelligence that can include ranking of coverage areas in the wireless environment of access point 1005, radio link quality and strength associated therewith, or the like. Memory 1045 also can store data structures, code instructions and program modules, system or device information, code sequences for scrambling, spreading and pilot transmission, access point configuration, and so on. Processor 1035 can be coupled, e.g., via a memory bus, to memory 1045 in order to store and retrieve information used to operate and/or confer functionality to the components, platform, and interface that reside within access point 1005.

Figure 11:
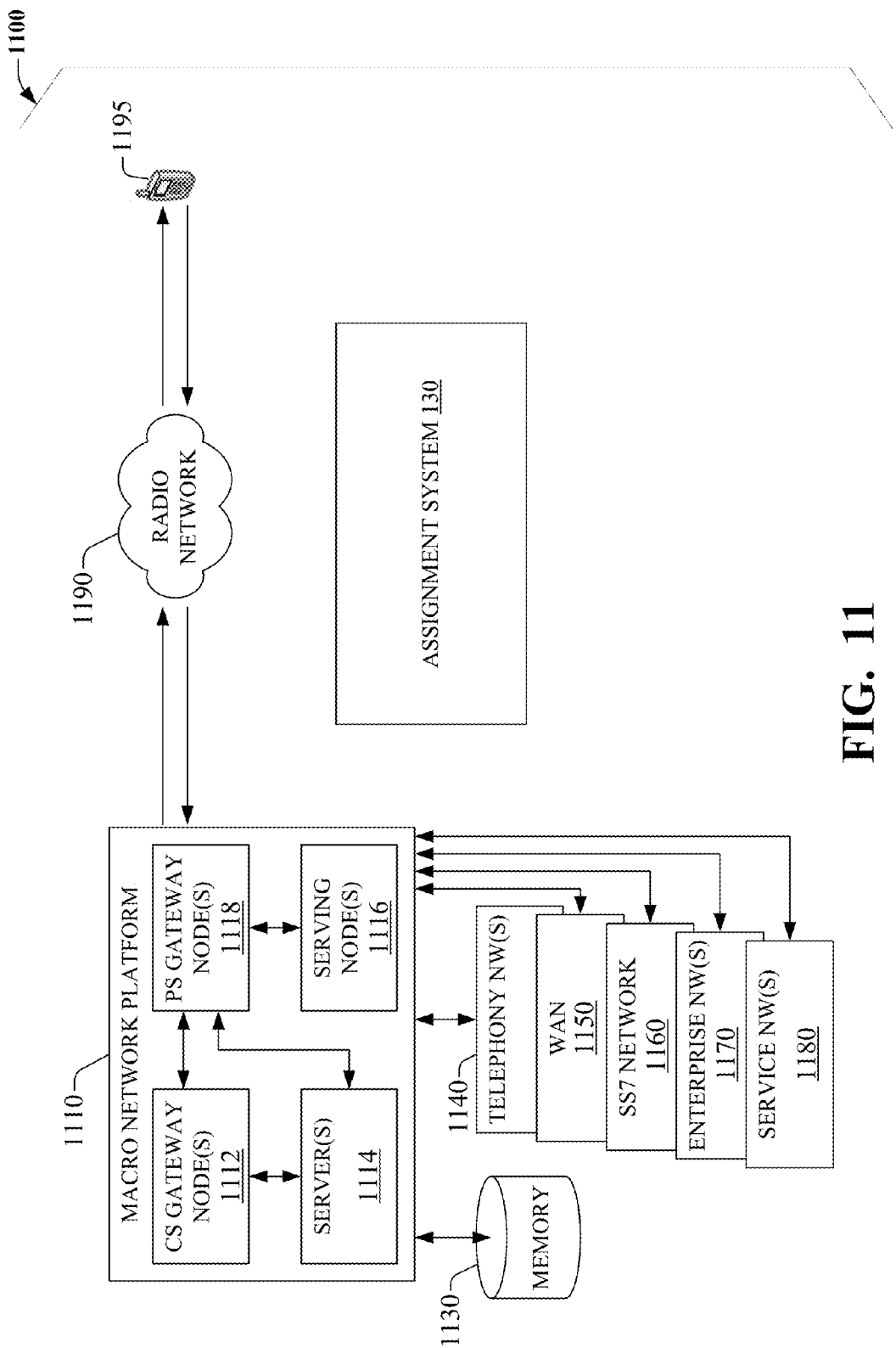
FIG. 11 illustrates yet another wireless communication environment, in accordance with an embodiment.

With respect to FIG. 11, a wireless communication environment 1100 including assignment system 130 and macro network platform 1110 is illustrated, in accordance with an embodiment. Macro network platform 1110 serves or facilitates communication with mobile device 1195, e.g., 120$_A$, 120$_B$, storage device 540, etc. via radio network 1190, e.g., radio network 210. It should be appreciated that in cellular wireless technologies (e.g., 3GPP UMTS, HSPA, 3GPP LTE, 3GPP2 UMB), macro network platform 1110 is embodied in a core network. It is noted that radio network 1190 can include base station(s), base transceiver station(s), or access point(s), and associated electronic circuitry and deployment site(s), in addition to a wireless radio link operated in accordance with the base station(s). Accordingly, radio network 1190 can comprise various coverage cells, or wireless coverage areas, e.g., macro cell 105. In addition, it should be appreciated that although assignment system 130 is illustrated in FIG. 11 as an entity distinct from other entities, elements, and/or components of wireless communication environment 1100, assignment system 130, and/or elements/components thereof, can be located/included within one or more components/elements, e.g., hardware, software, etc., of wireless communication environment 1100, e.g., macro network platform 1110, radio network 1190, and/or mobile device 1195. Further, it should be appreciated that other embodiments of systems described herein, e.g., assignment system 130, can be included within one or more components/elements of wireless communication environment 1100.

Generally, macro platform 1110 includes components, e.g., nodes, gateways, interfaces, servers, or platforms that facilitate both packet-switched (PS), e.g., internet protocol (IP), frame relay, asynchronous transfer mode (ATM), and circuit-switched (CS) traffic, e.g., voice and data, and control generation for networked wireless communication. In an aspect of the subject innovation, macro network platform 1110 includes CS gateway node(s) 1112 which can interface CS traffic received from legacy networks like telephony network(s) 1140, e.g., public switched telephone network (PSTN), or public land mobile network (PLMN), or a SS7 network 1160. Circuit switched gateway 1112 can authorize and authenticate traffic, e.g., voice, arising from such networks. Additionally, CS gateway 1112 can access mobility or roaming data generated through SS7 network 1160; for instance, mobility data stored in a visitor location register (VLR), which can reside in memory 1130. Moreover, CS gateway node(s) 1112 interfaces CS-based traffic and signaling and gateway node(s) 1118. As an example, in a 3GPP UMTS network, PS gateway node(s) 1118 can be embodied in gateway GPRS support node(s) (GGSN).

In addition to receiving and processing CS-switched traffic and signaling, PS gateway node(s) 1118 can authorize and authenticate PS-based data sessions with served, e.g., through macro RAN, wireless devices. Data sessions can include traffic exchange with networks external to the macro network platform 1110, like wide area network(s) (WANs) 1150; enterprise networks (NWs) 1170, e.g., enhanced 911, or service NW(s) 1180 like IP multimedia subsystem (IMS). It should be appreciated that local area network(s) (LANs), which may be a part of enterprise NW(s), can also be interfaced with macro network platform 1110 through PS gateway node(s) 1118. Packet-switched gateway node(s) 1118 generates packet data contexts when a data session is established. To that end, in an aspect, PS gateway node(s) 1118 can include a tunnel interface, e.g., tunnel termination gateway (TTG) in 3GPP UMTS network(s) (not shown), which can facilitate packetized communication with disparate wireless network(s), such as Wi-Fi networks. It should be further appreciated that the packetized communication can include multiple flows that can be generated through server(s) 1114. It is to be noted that in 3GPP UMTS network(s), PS gateway node(s) 1118 (e.g., GGSN) and tunnel interface (e.g., TTG) comprise a packet data gateway (PDG).

Macro network platform 1110 also includes serving node(s) 1116 that can convey the various packetized flows of information, or data streams, received through PS gateway node(s) 1118. As an example, in a 3GPP UMTS network, serving node(s) can be embodied in serving GPRS support node(s) (SGSN).

As indicated above, server(s) 1114 in macro network platform 1110 can execute numerous applications, e.g., location services, online gaming, wireless banking, wireless device management, etc. that can generate multiple disparate packetized data streams or flows; and can manage such flows, e.g., schedule, queue, format. Such application(s), for example can include add-on features to standard services provided by macro network platform 1110. Data streams can be conveyed to PS gateway node(s) 1118 for authorization/authentication and initiation of a data session, and to serving node(s) 1116 for communication thereafter. Server(s) 1114 can also effect security, e.g., implement one or more firewalls, of macro network platform 1110 to ensure network's operation and data integrity in addition to authorization and authentication procedures that CS gateway node(s) 1112 and PS gateway node(s) 1118 can enact. Moreover, server(s) 1114 can provision services from external network(s), e.g., WAN 1150, or Global Positioning System (GPS) network(s), which can be a part of enterprise NW(s) 1180. It is to be noted that server(s) 1114 can include one or more processors configured to confer at least in part the functionality of macro network platform 1110. To that end, the one or more processors can execute code instructions stored in memory 1130, for example.

In example wireless communication environment 1100, memory 1130 stores information, e.g., a usage history (see above), related to operation of macro network platform 1110. Information can include business data associated with subscribers; market plans and strategies, e.g., promotional campaigns, business partnerships; operational data for mobile devices served through macro network platform; service and privacy policies; end-user service logs for law enforcement; and so forth. Memory 1130 can also store information from at least one of telephony network(s) 1140, WAN 1150, SS7 network 1160, enterprise NW(s) 1170, or service NW(s) 1180.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

In the subject specification, terms such as "store," "data store," data storage," "database," and substantially any other information storage component relevant to operation and functionality of a component and/or process, refer to "memory components," or entities embodied in a "memory," or components comprising the memory. It will be appreciated that the memory components described herein can be either volatile memory or nonvolatile memory, or can include both volatile and nonvolatile memory.

By way of illustration, and not limitation, nonvolatile memory, for example, can be included in memory 1045, non-volatile memory 1222 (see below), disk storage 1224 (see below), and/or memory storage 1246 (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 12:
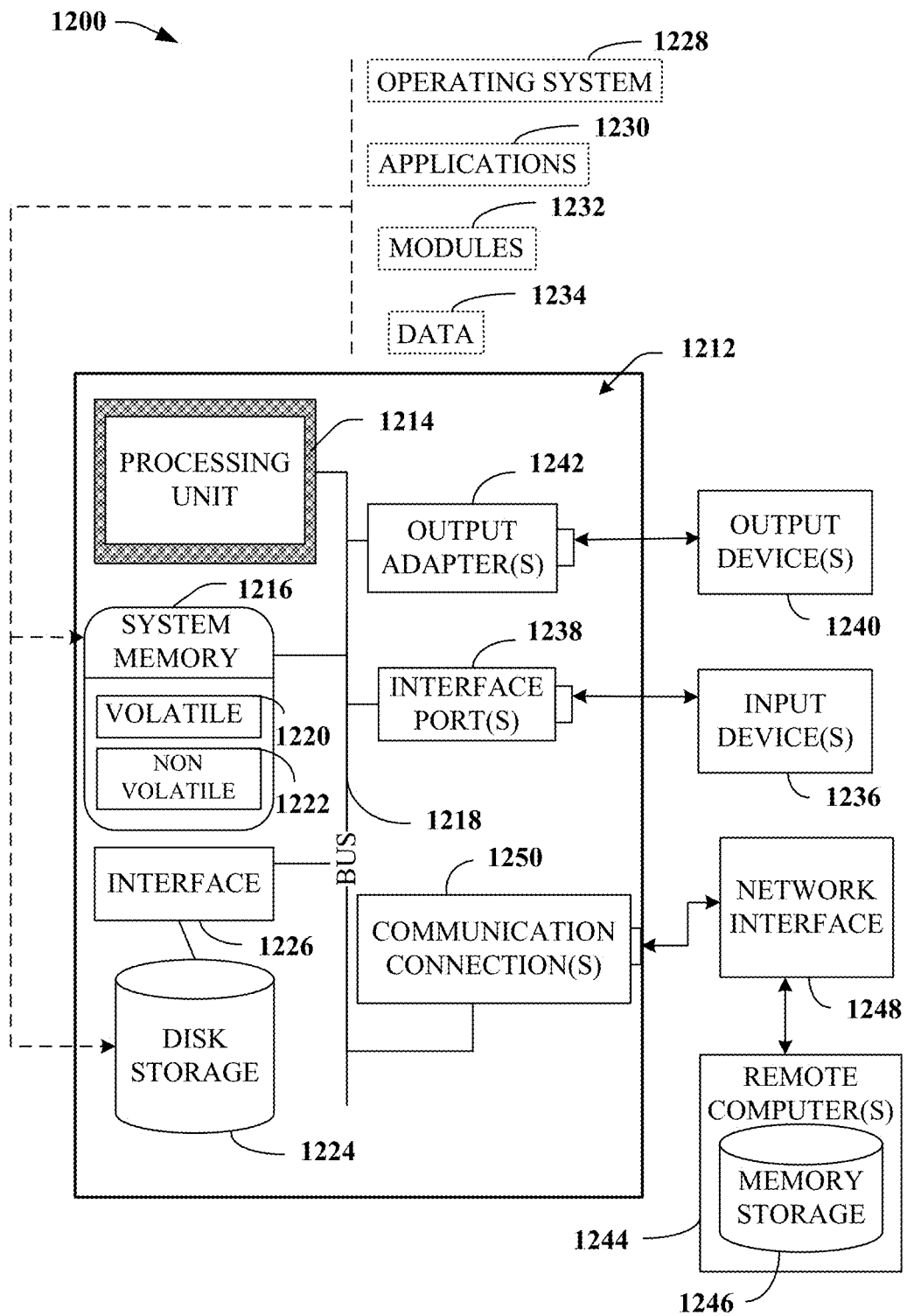
FIG. 12 illustrates a block diagram of a computing system operable to execute the disclosed methods and apparatus, in accordance with an embodiment.

In order to provide a context for the various aspects of the disclosed subject matter, FIG. 12, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the subject innovation also can be implemented in combination with other program modules. Generally, program modules include routines, programs, components, data structures, etc. that perform particular tasks and/or implement particular abstract data types.

Moreover, those skilled in the art will appreciate that the inventive systems can be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

With reference to FIG. 12, a block diagram of a computing system 1200 operable to execute the disclosed systems and methods is illustrated, in accordance with an embodiment. Computer 1212 includes a processing unit 1214, a system memory 1216, and a system bus 1218. System bus 1218 couples system components including, but not limited to, system memory 1216 to processing unit 1214. Processing unit 1214 can be any of various available processors. Dual microprocessors and other multiprocessor architectures also can be employed as processing unit 1214.

System bus 1218 can be any of several types of bus structure(s) including a memory bus or a memory controller, a peripheral bus or an external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

System memory 1216 includes volatile memory 1220 and nonvolatile memory 1222. A basic input/output system (BIOS), containing routines to transfer information between elements within computer 1212, such as during start-up, can be stored in nonvolatile memory 1222. By way of illustration, and not limitation, nonvolatile memory 1222 can include ROM, PROM, EPROM, EEPROM, or flash memory. Volatile memory 1220 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1212 also includes removable/non-removable, volatile/non-volatile computer storage media. FIG. 12 illustrates, for example, disk storage 1224. Disk storage 1224 includes, but is not limited to, devices like a magnetic disk drive, floppy disk drive, tape drive, Jaz drive, Zip drive, LS-100 drive, flash memory card, or memory stick. In addition, disk storage 1224 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1224 to system bus 1218, a removable or non-removable interface is typically used, such as interface 1226.

It is to be appreciated that FIG. 12 describes software that acts as an intermediary between users and computer resources described in suitable operating environment 1200. Such software includes an operating system 1228. Operating system 1228, which can be stored on disk storage 1224, acts to control and allocate resources of computer system 1212. System applications 1230 take advantage of the management of resources by operating system 1228 through program modules 1232 and program data 1234 stored either in system memory 1216 or on disk storage 1224. It is to be appreciated that the disclosed subject matter can be implemented with various operating systems or combinations of operating systems.

A user can enter commands or information, e.g., via interface component 830, into computer 1211 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to processing unit 1214 through system bus 1218 via interface port(s) 1238. Interface port(s) 1238 include, for example, a serial port, a parallel port, a game port, and a universal serial bus (USB). Output device(s) 1240 use some of the same type of ports as input device(s) 1236.

Thus, for example, a USB port can be used to provide input to computer 1212 and to output information from computer 1212 to an output device 1240. Output adapter 1242 is provided to illustrate that there are some output devices 1240 like monitors, speakers, and printers, among other output devices 1240, which use special adapters. Output adapters 1242 include, by way of illustration and not limitation, video and sound cards that provide means of connection between output device 1240 and system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. Remote computer(s) 1244 can be a personal computer, a server, a router, a network PC, a workstation, a microprocessor based appliance, a peer device, or other common network node and the like, and typically includes many or all of the elements described relative to computer 1212.

For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1250 refer(s) to hardware/software employed to connect network interface 1248 to bus 1218. While communication connection 1250 is shown for illustrative clarity inside computer 1212, it can also be external to computer 1212. The hardware/software for connection to network interface 1248 can include, for example, internal and external technologies such as modems, including regular telephone grade modems, cable modems and DSL modems, ISDN adapters, and Ethernet cards.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   storing, by a system comprising a processor, data that references a radio access technology associated with a first use of a wireless communication network;
   in response to determining that a request for a second use of the wireless communication network is based on a change in a first condition associated with a signal quality of a communication channel of the wireless communication network, selecting, by the system for the second use, a generation of the radio access technology compatible with the change in the first condition; and
   in response to determining that the request for the second use is based on a second condition with respect to a reduction of the signal quality that is compatible with the second use and in response to determining, based on the data, that a stored generation of the radio access technology associated with the first use is a later generation than a requested generation of the radio access technology associated with the request for the second use, selecting, by the system, the requested generation of the radio access technology associated with the request for the second use.

2. The method of claim 1, wherein the selecting the requested generation further comprises selecting the requested generation of the radio access technology in response to detecting a registration of a wireless communication device associated with the request for the second use.

3. The method of claim 1, further comprising:
   updating, by the system, the data based on the second use.

4. The method of claim 1, wherein the selecting the requested generation further comprises selecting, by the system for the second use, the requested generation of the radio access technology in response to receiving a request for a reselection.

5. The method of claim 4, further comprising:
   denying, by the system, the request for the reselection based on the data.

6. The method of claim 4, further comprising:
   granting, by the system, the request for the reselection in response to determining that the request for the reselection is based on the change in the first condition.

7. The method of claim 1, wherein the selecting the requested generation further comprises selecting, by the system for the second use, the requested generation of the radio access technology in response to determining that the request is associated with a transfer of wireless communications to another wireless communication network.

8. The method of claim 7, further comprising:
   denying, by the system, the request based on the data.

9. The method of claim 7, further comprising:
   granting, by the system, the request in response to determining that the request is based on the change in the first condition.

10. The method of claim 1, wherein the storing further comprises storing, by the system, the data in a removable data storage device communicatively coupled to a wireless communication device associated with the first use.

11. The method of claim 1, wherein the storing further comprises storing, by the system, the data in a data storage device that is communicatively coupled to a network device of the wireless communication network.

12. A system, comprising:
a memory that stores executable instructions; and
a processor, coupled to the memory, that facilitates execution of the executable instructions to perform operations, comprising:
storing, based on a first use of a wireless communication network, information representing a first generation of a radio access technology associated with the first use;
selecting, for a second use of the wireless communication network, a second generation of the radio access technology that is compatible with a change in a first condition of a signal quality of a communication channel of the wireless communication network in response to determining that a request for the second use is based on the change in the first condition of the signal quality of the communication channel; and
selecting a third generation of the radio access technology associated with the request for the second use in response to determining, based on the information, that the third generation of the radio access technology associated with the request for the second use is an earlier generation than the first generation of the radio access technology associated with the first use and in response to determining that the request for the second use is based on a second condition with respect to a decrease of the signal quality.

13. The system of claim 12, wherein the selecting the second generation of the radio access technology further comprises selecting the second generation of the radio access technology based on the information in response to performing a registration of a wireless communication device via the wireless communication network.

14. The system of claim 12, wherein the operations further comprise:
determining whether a request for a transfer of a wireless communication to another wireless communication network is based on the change in the first condition of the signal quality of the communication channel; and
in response to determining that the request for the transfer of the wireless communication is based on the change in the first condition of the signal quality, selecting for the second use another radio access technology that is different than the second radio access technology.

15. The system of claim 12, wherein the operations further comprise:

determining whether a request for a reselection is based on the change in first the condition of the signal quality; and
in response to determining that the request for the reselection is based on the change in first the condition of the signal quality, selecting for the second use another radio access technology that is different than the second radio access technology.

16. A wireless communication device, comprising:
a memory that stores executable instructions; and
a processor, coupled to the memory, that facilitates execution of the executable instructions to perform operations, comprising:
storing, based on a first use of a wireless communication network, information representing a first generation of a radio access technology associated with the first use;
sending the information directed to a device of the wireless communication network based on a request for a second use of the wireless communication network; and
communicating, during the second use based on a second generation of the radio access technology associated with the request that is earlier than the first generation of the radio access technology, other information directed to the device of the wireless communication network in response to a determination that the request is associated with a reduction of signal quality of a communication channel of the wireless communication network that is compatible with the second use and in response to a determination, based on the information, that the second generation of the radio access technology is earlier than the first generation of the radio access technology.

17. The wireless communication device of claim 16, wherein the storing further comprises storing the information in a removable data storage device communicatively coupled to the wireless communication device.

18. The wireless communication device of claim 16, wherein the storing further comprises storing the information in a storage medium communicatively coupled to a device of the wireless communication network.

19. The wireless communication device of claim 16, wherein the communicating further comprises communicating the information in response to a registration of the wireless communication device.

20. The wireless communication device of claim 16, wherein the operations further comprise:
updating the information based on the second use.

* * * * *